(12) United States Patent
Lider et al.

(10) Patent No.: US 9,158,440 B1
(45) Date of Patent: Oct. 13, 2015

(54) DISPLAY OF INFORMATION AREAS IN A VIEW OF A GRAPHICAL INTERFACE

(75) Inventors: Brett Rolston Lider, San Francisco, CA (US); Andrew J. Hertzfeld, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 114 days.

(21) Appl. No.: 13/564,703

(22) Filed: Aug. 1, 2012

(51) Int. Cl.
*G06F 3/0485* (2013.01)
*G06F 3/0481* (2013.01)

(52) U.S. Cl.
CPC ............ *G06F 3/0485* (2013.01); *G06F 3/0481* (2013.01); *G06F 3/04812* (2013.01)

(58) Field of Classification Search
CPC .. G06F 3/04812; G06F 3/0481; G06F 3/0485
USPC ......... 715/784, 765, 768, 771, 781, 785, 786, 715/787, 788
See application file for complete search history.

(56) References Cited

U.S. PATENT DOCUMENTS

| 5,819,055 | A | 10/1998 | MacLean | |
|---|---|---|---|---|
| 6,448,986 | B1 | 9/2002 | Smith | |
| 6,738,079 | B1 | 5/2004 | Kellerman | |
| 7,634,742 | B2 | 12/2009 | Sawyer | |
| 8,959,453 | B1* | 2/2015 | Harnish et al. ................ | 715/788 |
| 2006/0236264 | A1* | 10/2006 | Cain et al. ...................... | 715/788 |
| 2007/0186178 | A1* | 8/2007 | Schiller ......................... | 715/769 |
| 2008/0052637 | A1* | 2/2008 | Ben-Yoseph et al. ......... | 715/800 |
| 2008/0278441 | A1* | 11/2008 | Larsen ............................ | 345/156 |
| 2008/0313547 | A1 | 12/2008 | Wallis | |
| 2010/0199180 | A1* | 8/2010 | Brichter ......................... | 715/702 |
| 2011/0113337 | A1* | 5/2011 | Liu et al. ........................ | 715/727 |
| 2011/0119609 | A1 | 5/2011 | Bhatt | |
| 2012/0054674 | A1* | 3/2012 | Beykpour et al. .............. | 715/788 |
| 2012/0131497 | A1* | 5/2012 | Jitkoff ............................ | 715/786 |
| 2012/0204125 | A1* | 8/2012 | Shia et al. ...................... | 715/773 |
| 2012/0216121 | A1* | 8/2012 | Lin et al. ........................ | 715/721 |
| 2012/0297324 | A1* | 11/2012 | Dollar et al. ................... | 715/760 |
| 2012/0304111 | A1* | 11/2012 | Queru ............................ | 715/784 |
| 2013/0167073 | A1* | 6/2013 | Ari et al. ........................ | 715/798 |

OTHER PUBLICATIONS

Unitid Interaction Designers, "Multiple Select—Checkbox." Android Interaction Design Patterns. Dec. 3, 2010. Web. Jan. 14, 2014. <http://www.androidpatterns.com/uap_pattern/multiple-select---checkbox>.*

* cited by examiner

*Primary Examiner* — Sherrod Keaton
*Assistant Examiner* — Justin R Blaufeld
(74) *Attorney, Agent, or Firm* — IP Spring

(57) ABSTRACT

In some implementations, a method includes causing a display of a portion of a data presentation within a view in a graphical interface, where different portions of the data presentation are displayable. The method includes determining at least one current state of the device, and causing a display of one or more information areas within the view based on the current state, including determining a display mode from available display modes for each of the information areas. The available display modes include independent and dependent display modes, where the independent display mode causes an information area to be displayed within the view regardless of the displayed portion of the data presentation, and the dependent display mode causes the information area to be associated with one or more locations in the data presentation and displayed within the view based on an associated location being in the view.

15 Claims, 10 Drawing Sheets

DISPLAY OF INFORMATION AREAS IN A VIEW OF A GRAPHICAL INTERFACE

BACKGROUND

Graphical interfaces are used to display information by computer systems of all types, and on various size display screens. In some graphical interfaces used for application programs, a window is displayed with selectable controls at the top of the window and a main display view that displays a data presentation, such as a document, web page, or other data. The main display view used to display the data presentation can also display active controls which are selectable by a user to activate functions of the graphical interface, application program, or data. For example, some web pages can include their own toolbars or other areas providing user-selectable functions or displaying dynamic information which is more specialized and pertinent to the web page than general web browser toolbars or interfaces.

SUMMARY

Implementations of the present application relate to display of information areas in a view of a graphical interface. In some implementations, a method includes causing the display by a device of a portion of a data presentation within a view in the graphical interface, where different portions of the data presentation are displayable in the view. The method determines at least one current state of the device and causes the display of one or more information areas within the view. The causing of the display of information areas includes determining a display mode from multiple available display modes for each of the information areas based on the current state. The available display modes include an independent display mode and a dependent display mode, where the independent display mode causes an information area to be displayed within the view regardless of which portion of the data presentation is being displayed in the view, and the dependent display mode causes the information area to be associated with one or more locations in the data presentation and to be displayed within the view in response to at least one of the associated locations being provided in the displayed portion of the data presentation.

In various implementations of the above method, the view can be scrollable relative to the view allowing the display of the different portions of the data presentation in the view. The information area in the independent display mode can be displayed unaffected in displayed position within the view by scrolling of the data presentation in the view, and the information area in the dependent display mode is scrolled with the data presentation and is removed from the view in response to the associated locations being scrolled out of the view. One of the associated locations for the information areas in dependent display mode can be provided at a beginning of the data presentation. An information area can be a toolbar displaying selectable controls or status information. Determining the current state of the device can include determining a size of the view, where the selected display modes are based on the determined size of the view, and the display mode can be changed in response to a change in the view size. Determining the current state of the device can include determining that a user has accessed a function presented by the graphical interface, such as selecting or deselecting one or more items or selecting to output media data, where the selected display mode is based on the accessed function.

Multiple information areas can each be assigned a different associated priority level, such that an information area having a lower priority level has less priority in being assigned the independent display mode than one having a higher priority. For example, the display modes of information areas having the lowest priority can be changed if the view size is reduced. A particular information area can be displayed to one side of the data presentation if the view is above a threshold dimension, and a reduced form of that information area can be displayed over the data presentation if the view is under a threshold dimension.

In some implementations, a method includes causing the display by a device of only a portion of a data presentation within a view in the graphical interface, where the data presentation is scrollable relative to the view allowing display of different portions of the data presentation in the view. The method determines at least one current state of the device including a size of the view, and causes a display of one or more toolbars within the view, each toolbar displaying one or more controls selectable by the user and/or status information. Causing the display includes determining a display mode from available display modes for each of the toolbars based on the at least one current state including the view size. The available display modes include an independent display mode and a dependent display mode. The independent display mode causes a toolbar to be displayed in the view and unaffected in displayed position within the view by scrolling of the data presentation in the view. The dependent display mode causes the toolbar to be located in at least one particular location in the data presentation such that the toolbar is scrolled with the data presentation in the view, and the toolbar is removed from the view in response to the at least one location being scrolled out of the view.

In some implementations, a system includes a storage device and at least one processor accessing the storage and operative to perform operations. The operations include causing the display by a device of at least a portion of a data presentation within a view in the graphical interface, where different portions of the data presentation are displayable in the view. The operations include determining at least one current state of the device, and causing the display of one or more information areas within the view. Causing the display includes determining a display mode from multiple available display modes for each of the information areas based on the at least one current state. The available display modes include an independent display mode and a dependent display mode, where the independent display mode causes an information area to be displayed within the view regardless of which portion of the data presentation is being displayed in the view, and the dependent display mode causes the information area to be associated with one or more locations in the data presentation and to be displayed within the view in response to at least one of the associated locations being provided in the displayed portion of the data presentation.

Some implementations of the system can include the view as scrollable relative to the view allowing the display of the different portions of the data presentation in the view. The information area in the independent display mode can be displayed unaffected in displayed position within the view by scrolling of the data presentation in the view, and the information area in the dependent display mode is scrolled with the data presentation and is removed from the view in response to the associated locations being scrolled out of the view. Information areas can be toolbars displaying selectable controls or status information. The processor operations can include determining a size of the view, where display modes for the information areas are based on the determined view size. The processor can determine that a user has accessed a function presented by the graphical interface, where the display mode is based on the accessed function. Multiple information areas can each be assigned a different associated priority level, such that an information area having a lower priority level has less priority in being assigned the independent display mode than an information area having a higher priority. A particular information area can be displayed to one side of the data presentation if the view is above a threshold dimension, and a reduced form of that information area can be displayed over the data presentation if the view is under a threshold dimension.

Some implementations can provide advantages. For example, some implementations enable displayed information areas in a view of graphical interface to flexibly assume either of two display modes. Information areas displayed in independent mode can be conveniently viewable and accessible to the user regardless of the scrolled position of the data presentation. Information areas in dependent mode can be scrolled or otherwise moved out of the displayed view to allow a larger portion of the data presentation to be viewed. The display modes can be situationally or conditionally determined to provide convenient and efficient access to pertinent information areas by a user.

DETAILED DESCRIPTION

Figure 1:
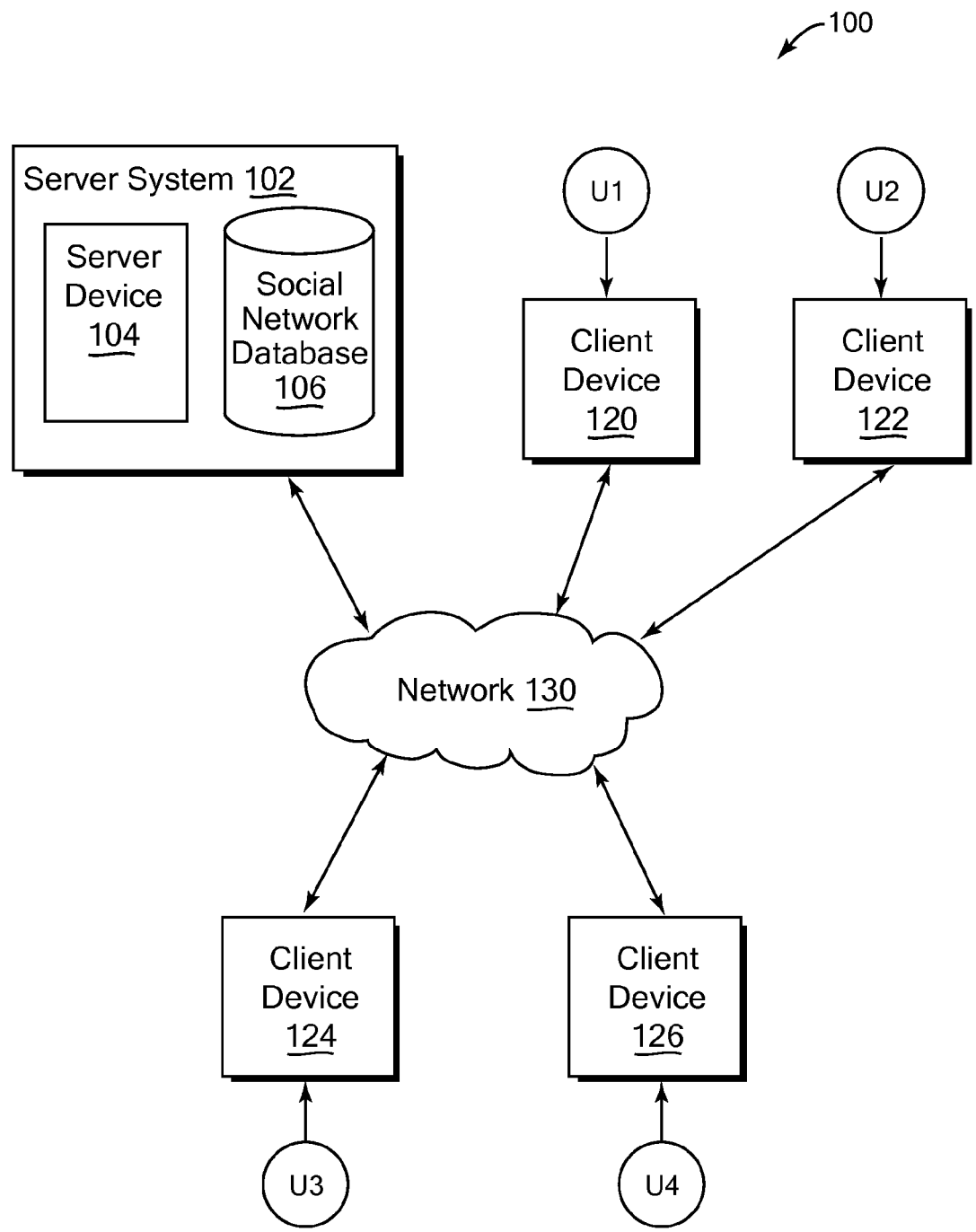
FIG. 1 is a block diagram of an example network environment which may be used for one or more implementations described herein.

One or more implementations described herein relate to display of information areas in a view of a graphical interface. When displaying a data presentation in a view of a graphical interface on a device, a device can display information areas in the view independently of the data presentation, or display information areas in the view as dependent areas as part of the data presentation, based on a current state of the device.

Implementations described herein can enable information areas, such as toolbars, panels, or other displayed areas, to flexibly assume a particular display mode in a view of a graphical interface. For example, information areas in an independent display mode can be conveniently viewable and accessible to the user regardless of the scrolled position of the data presentation. Information areas in a dependent display mode can be moved out of the displayed view to allow a larger portion of the data presentation to be viewed. The display modes of the information areas can be situationally or conditionally determined to provide convenient and efficient access to these areas by the user, and these information areas can be more pertinent to the data presentation than generalized controls or information provided by an application program in the graphical interface.

In one example, a device displays a data presentation, such as a document, partially within a view of a graphical interface. For example, the view can be displayed within an application program interface, such as a window of a web browser or other program. In some implementations, the data presentation, such as a document, is scrollable relative to the view to allow different portions of the document to be displayed in the view. The device provides one or more information areas within the view. For example, the information areas can be toolbars that display controls selectable by the user to activate or access functions or display status information for the device. Other implementations can display other types of information areas that are graphical elements such as panels or windows.

Based on one or more current device states, the device determines a display mode for each of the information areas. Example display modes include independent display mode and dependent display mode. The independent display mode displays an information area within the view independently of the data presentation. For example, in a data presentation of images, a toolbar, such as a search toolbar, can be displayed fixed in position within the view during scrolling of the view over different images. This allows continual display of the toolbar regardless of scrolled position of the images. In contrast, the dependent display mode displays the information area within the view as part of the data presentation. In one example, the search toolbar can be displayed at the beginning or end of a set of the images and is scrolled along with the images as they are scrolled. Various implementations allow the display mode determination to be based on different types of states of the device, such as a size of the view that displays the data presentation, or user input or actions, such as user selection of a function presented by the interface.

FIG. 1 illustrates a block diagram of an example network environment 100, which may be used in some implementations to implement one or more features described herein. In some implementations, network environment 100 includes one or more server systems. For example, server system 102 can communicate with a network 130 as shown in FIG. 1. Server system 102 can include a server device 104 and a social network database 106 or other storage device. Network environment 100 also includes one or more client devices, such as client devices 120, 122, 124, and 126, which may communicate with each other via network 130 and server system 102. Network 130 can be any type of communication network, including one or more of the Internet, local area networks (LAN), wireless networks, switch or hub connections, etc.

For ease of illustration, FIG. 1 shows one block for server system 102, server device 104, and social network database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, social network database 106 and/or other storage devices can be provided in server system block(s) that are separate from server device 104 and can communicate with server device 104 and other server systems via network 130. Also, there may be any number of client devices. Each client device can be any type of electronic device, such as a computer system, portable device, cell phone, smart phone, tablet computer, television, television set top box or entertainment device, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and with each other using their respective client devices 120, 122, 124, and 126. In some implementations, each user can receive information, status, messages and notifications from other users and a social network via a social network system implemented by network system 100. In one example, users U1, U2, U3, and U4 may interact with each other via the social network system, where respective client devices 120, 122, 124, and 126 transmit communications and data to one or more server systems such as server system 102, and the server system 102 provides appropriate data to the client devices such that each client device can receive shared content uploaded to the social network system via the server system 102. The social network system can be any system allowing users to perform a variety of communications, form links and associations, upload and post shared content, and/or perform other socially-related functions. In some implementations, a "user" can include one or more programs or virtual entities, as well as persons that interface with the system or network. Other implementations can use other forms of systems instead of social network systems.

Respective to features described herein, each user can interact with the social network system using a graphical interface provided on an associated client device 120-126. The graphical interface can be displayed on an output device of the client device, such as a display screen. For example, in some implementations, the interface elements can be displayed using a particular standardized format, such as a web page in a web browser or other application and provided in Hypertext Markup Language (HTML), Java™, JavaScript, Extensible Markup Language (XML), Extensible Stylesheet Language Transformation (XSLT), and/or other format. Other types of graphical interfaces and data presentations can be used with features described herein. The graphical interface can display a data presentation, such as content provided by one or more users of the social network system. The data presentation can be provided by the server device 104 to one or more client devices 120-126 over the network 130. In other implementations, the data presentation can be provided from a source local to the client, such as local storage. Other elements of the graphical interface, such as information areas or other features, can be provided from the server system 102 and/or locally by the client device.

In other implementations, the graphical interface can display any other type of data presentation, such as a document, spreadsheet, or other data of text, images, video, icons, or other media types. The interface can be used in networked implementations as shown in FIG. 1 or in implementations provided locally to a client device.

Figure 2:
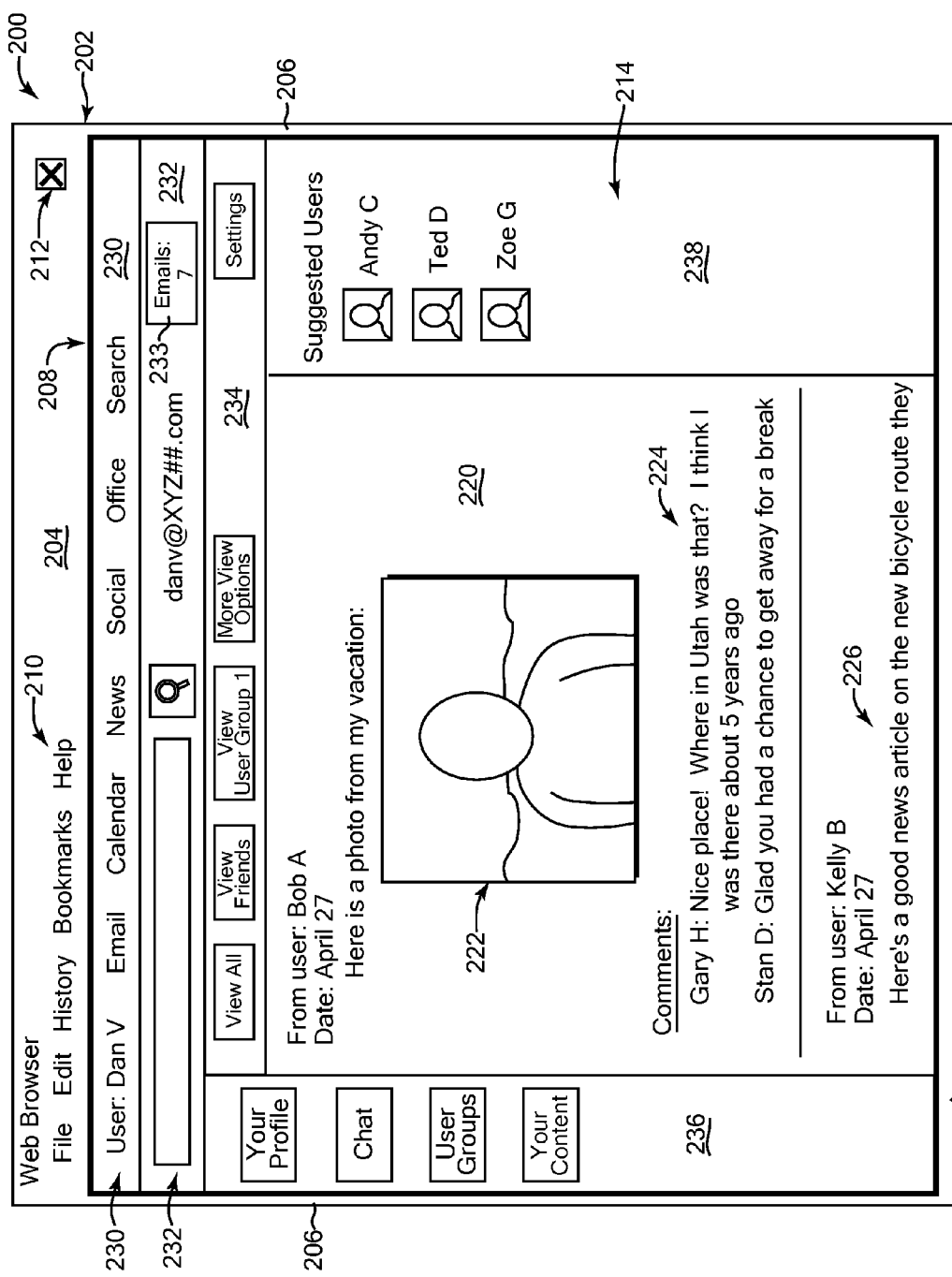
FIG. 2 is illustration of an example graphical user interface (GUI) displaying a data presentation and information areas in a view of the interface.

FIG. 2 is a diagrammatic illustration of an example simplified graphical user interface (GUI) 200 displaying a data presentation and information areas in a view of the interface. GUI 200 can be displayed, for instance, on a display of a client device 120, 122, 124, and/or 126, or a server device 104 in some implementations. For example, the GUI 200 can be displayed as part of an operating system or application running on a client device or server device.

In the example of FIG. 2, the interface 200 includes a displayed window 202 within the GUI. The window 202 can be displayed as part of an application program or other type of program running on the device. In one example, a web browser application (or other application with similar functionality) displays the window 202. The window 202 includes a header portion 204, borders 206, and a view 208.

The header portion 204 can display the name of an application program associated with the window, as well as various interface items, including controls and information. These interface items are displayed as part of the window interface, and are outside the view 208. For example, in the example shown, menu items 210 are displayed in the header portion 204. The menu items cause a display of menus of additional selectable items and functions when selected. A close button 212 is also displayed in the header portion 204, which causes the window 202 to be removed from the display screen when selected. Other header items can include graphical buttons or icons for executing associated functions, tabs for displaying different views, and status information of the device or interface related to an associated function. Borders 206 extend around the perimeter of the window 202 and surround the view 208 located inside the borders 206. In the example of FIG. 2, the borders 206 are only used to mark a visual enclosure for the window. In other implementations, interface items can be displayed in the borders 206, such as scroll bars allowing a user to scroll a portion of a data presentation displayed within the view 208.

A view, such as view 208, is provided in the graphical interface 200. The view can be a sub-portion of the entire display area of the display device in some implementations. For example, in some implementations, view 208 is provided as a designated viewing area in window 202 surrounded by the header portion 204 and borders 206 in the example of FIG. 2, and in some implementations is referred to as a "viewport" of the window. In some implementations, the view can be any display area of the display device, in any shape or size.

View 208 displays a data presentation or portion thereof, which can include data read by the program displaying the view 208. For example, the data presentation can be (or derived from) a document, spreadsheet, web page, image(s), game, additional windows, collection of icons or other items, video sequence, animation, and/or other type of data. In the example of FIG. 2, the data presentation is provided as part of a web page 214 and includes text, one or more images, links, buttons, and other controls and information. In one example, the data of the web page 214 can be downloaded from the server system 102 for display on a client device in a web browser or other application program. Some implementations can display any type of data in the view 208, such as any web page accessible on the Internet or other network. In some implementations, the view 208 can display data provided from a local source, such as a storage device of the client device, rather than (or in addition to) receiving the web page data from a server system over a network.

In some implementations, a portion of the entire data presentation is displayed in the view 208 to allow features of the data presentation to be displayed at a large enough size to be better read or viewed by the viewing user, while the other portions are not displayed. For example, the view 208 can be scrolled relative to the data presentation, or conversely, the data presentation can be scrolled relative to the view 208. Herein, this scrolling refers to the data presentation being scrolled relative to the view 208; however, this can alternatively be understood to mean the view 208 is being scrolled relative to the data presentation. For example, the data presentation can be scrolled based on user input from an input device, such as a mouse wheel, keyboard key or button, touch on a touchscreen, etc. In some implementations, the scrolling can be based on user manipulation of displayed scroll bars in the interface 200 or window 202, or other controls displayed in the GUI 200. Scrolling can be performed vertically, horizontally, and/or other directions in various implementations.

In some implementations, the web page 214 can include displayed information and controls related to a social networking system that allows users of the networking system to communicate with each other, view each others' status and content, and perform other activities. In the present example, a content area 220 of the view 208 (or posting area) displays data from the data presentation, such as content from one or more users, including images, video sequences, text, comments, ratings, links (e.g., to cause additional display or playback of windows, other content, web pages, etc.), and/or other content. In this example, the data presentation includes photo content 222 posted from one user, followed by first text comments 224 from other users of the social network system. The data presentation also includes content of second text comments 226 posted by a different user and following the first text comments 224, the second text comments 226 are not fully displayed in the view 208.

The web page 214 displayed in view 208 also includes several "information areas" which as used herein encompasses its plain and ordinary meaning, including but not limited to defined areas or graphical elements within the view, where such areas can include various controls and/or information. In the example of FIG. 2, some information areas are implemented as "toolbars" which include various user-selectable controls and information which the user viewing the web page 214 can select or view. In some implementations, these toolbars can include functional items to activate associated functions of the application, interface, or device. In some implementations the toolbars can include elements similar to the GUI interface items displayed in the header portion 204 and borders 206 of window 202, but unlike the GUI interface items, the toolbars are included in the web page 214 and are therefore displayed within the view 208. In this example, both horizontal and vertical toolbars are displayed in the view 208. The horizontal toolbars include a function toolbar 230, a search toolbar 232, and a group view toolbar 234. The vertical toolbars include a navigation toolbar 236 and a right side toolbar 238.

In this example, function toolbar 230 displays a number of options which the user may select to navigate to different web page interfaces providing different functions for the user. For example, selecting the "email" option causes an email interface to be loaded and displayed in view 208 instead of the web page, the "calendar" option causes a calendar interface to be displayed, and a "social" option causes a different social network interface to be displayed. These can be more general options for the user. The search toolbar 232 displays search and other options including a search field allowing entry of one or more search terms to search the content displayed in content area 220, a search button to initiate the search, a display of email address information relating to the user viewing the interface 200, and status information 233 indicating a number of emails received. The group view toolbar 234 displays a number of options allowing different content from different user groups to be displayed in the content area 220, such as content from the "friends" group, content from a particular User Group 1, or content from all users.

The vertical navigation toolbar 236 displays several options related to social network functions, such as displaying the user's profile information, displaying a chat interface to talk or type text in communication with other users, displaying a list of the user's user groups (such as "circles" or friends lists), and displaying the user's own posted content. The right side toolbar 238 can display a number of suggested users which have been found to be related to the viewing user through friends or contacts. Other information can also be displayed in the right side toolbar 238 depending on the other screens or interfaces selected from toolbars 236 or 230, such as a chat window, news items, etc.

Other types of information areas besides toolbars can be displayed in the view 208. For example, windows or panels displaying controls and/or status information can be displayed, in any desired configuration and/or position within the view 208.

According to the features described herein, one or more toolbars (or other designated information areas) displayed within the view 208 can be displayed in example modes, including an "independent display mode" and a "dependent display mode." In the independent display mode, an information area (e.g., toolbar) is displayed independently of the data presentation such that it is displayed within the view regardless of which portion of the data presentation is being displayed in the view. In the dependent display mode, an information area is displayed as part of the data presentation. For example, the information area is associated with one or more locations in the data presentation and is displayed within the view if at least one of the associated locations is in the currently-displayed portion of the data presentation. Thus, in some implementations, a toolbar can be displayed as either separate from and "superimposed" on the data presentation, or can be displayed to be included in the data of the data presentation displayed in the view 208 and manipulated with the data, depending on the display mode of each toolbar. In one example, an information area in independent display mode is displayed unaffected in display position in the view 208 regardless of how the data presentation is scrolled, moved, or otherwise changed in the view. In one example, the toolbar maintains a fixed position in the view 208 with respect to the area of the defined view, or in other implementations it can be moved within the view but remains displayed within the view. In an example, an information area in dependent display mode is scrolled, moved, or otherwise changed in display in the same manner as the data presentation as if the information area is part of the data in the data presentation, and is removed from the view in response to the associated location(s) being moved out of the view.

The display mode of a toolbar can be based on one or more current states of the device displaying the interface 200, such as the client device. The current states of the device can include a display feature or a state related to the view, such as current size of the view 208 or a user action within the view to access a function of the interface or device. The current state may also be a different user action to access a function of the interface or device, an event occurring on the device or received by the device, a change in a displayed feature or event, or other state. Some examples of these states affecting the display mode of one or more information areas are described in FIGS. 2-6.

In some implementations, the current state of the device on which information area display modes are based includes the current size of the view 208 in which the information areas are displayed. In one example, a smaller view 208 causes one or more of the information areas to be displayed in dependent mode, while a larger view 208 causes these information areas to be displayed in independent mode.

As an example in FIG. 2, toolbars 230, 232, and 234 are information areas that are displayed in independent display mode when the vertical size of view 208 is the size shown in the figure. For example, these toolbars 230-234 can remain displayed at the top of the view 208 even if the viewing user scrolls the data presentation so that at least part of the content shown in the content area 220 is different. In one example, the size of the window can be increased in the vertical dimension further than shown in FIG. 2, and the toolbars 230, 232, and 234 will remain displayed. The independent display mode allows these toolbars to remain be displayed in the view 208 regardless of how the data presentation is scrolled or moved (horizontally or vertically) and regardless of the particular content being displayed in the content area 220. This in turn allows the functions of these toolbars to continually be available to a user during display of the view 208 regardless of which data or content is displayed, while the vertical size of the view 208 is still sufficiently large to display a significant part of the content in content area 220. In some implementations, information areas in independent display mode can be moved within the view, e.g., by a user or program.

In some implementations, vertical toolbar 236 can be displayed in independent display mode so that the toolbar 236 remains displayed in its current location in view 208 regardless of how the data presentation is scrolled or moved (horizontally or vertically), and regardless of which portion of the data presentation is displayed in content area 220. In one example, the vertical toolbar 238 can be displayed in dependent display mode, so that the toolbar 238 is considered part of the data presentation and will be scrolled or otherwise changed in display with the data displayed in the content area 220.

Figure 3:
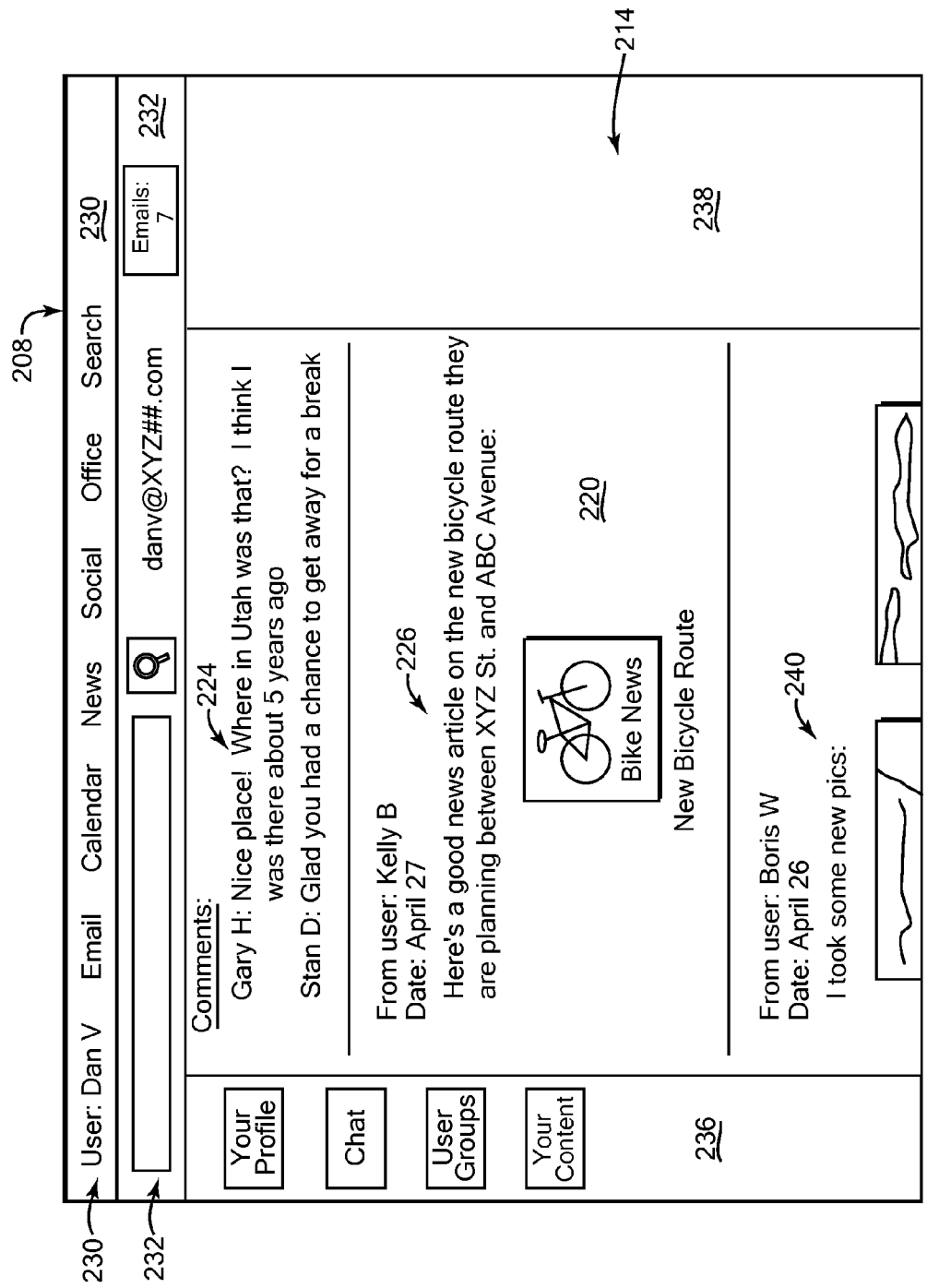
FIG. 3 is a diagrammatic illustration of the GUI displaying the data presentation scrolled and a view of reduced size.

FIG. 3 is a diagrammatic illustration of the graphical interface (GUI) 200 displaying the data presentation in the view 208 (window 202 not shown), in which the size of the view 208 has been reduced and the data presentation has been scrolled in the view 208. In this example, the vertical size of the window has been reduced compared to the view 208 in FIG. 2, to a size below a predetermined threshold vertical size. For example, a user may have dragged the bottom border of the window up to make the window 202 and view 208 smaller. Or, the interface 200 may have been re-displayed in FIG. 3 on a different display device having a smaller vertical display dimension.

This view size change causes one or more of the horizontal toolbars 230-234 to change from independent display mode to dependent display mode. In this example, the toolbar 234 has been changed to the dependent display mode. This causes the toolbar 234 to be displayed as if it were part of the data presentation displayed in content area 220, and be associated with a location in the data presentation. In this example, the toolbar 234 has been associated with a location at the top or beginning of the data in the data presentation. Vertical toolbar 238 is also displayed in dependent display mode and therefore is part of the data presentation associated with a location at the side of the web page 214.

Furthermore, in FIG. 3 the data presentation in content area 220 has been scrolled upward such that the top or beginning location of the content area (as shown at the top of view 208 in FIG. 2) has been moved out of (e.g., "above") the view 208 and is no longer displayed in the view, while a lower portion of the data presentation has been moved into the view 208 and is now displayed in the view. For example, the photo 222 of FIG. 2 has been moved out of the view 208, the comments 224 have been moved to the top of the content area 220, and the content 226 has been moved from the bottom to the middle of the content area 220. More user content 240 from a different user has been scrolled into view at the bottom of the view 208.

Since the toolbar 234 is in dependent mode and is has been associated with the data presentation at a location at the top of the scrollable portion of the data, the toolbar 234 has been scrolled up and out of the view 208. Thus, it is removed from the display, i.e., no longer displayed in view 208 in FIG. 3 and is "hidden." The user can cause the toolbar 234 to again be displayed in view 208 by scrolling the data presentation down to display the top of the data in the view. In some implementations, an information area set in dependent display mode can be associated with a different location of the data presentation than the top, such as the bottom, a designated middle location, etc. Some implementations can allow an information area to be associated with multiple locations in the data presentation, causing the information area to be displayed in the view if any of those locations is in a portion of the data presentation displayed in the view. Toolbar 238 has also been scrolled upward such that the icons and text shown in FIG. 2 have been scrolled out of view. In this example, the toolbar 238 itself, however, runs down the entire vertical length of the data presentation and so remains displayed in view 208.

The hiding of the toolbar 234 is advantageous to the user because the vertical size of the view 208 has been reduced. If toolbar 234 were to still be displayed in independent mode, it would cover a portion of the data presentation, which is a larger percentage of the data presentation being out of view than in the larger view size of FIG. 1. Thus, by setting the toolbar 234 to dependent mode upon a lower view size, the user can view a sufficiently large portion of the data presentation. This is especially advantageous for smaller screen displays, such as display screens on laptops, tablet computers, cell phones, and other portable display devices.

Figure 4:
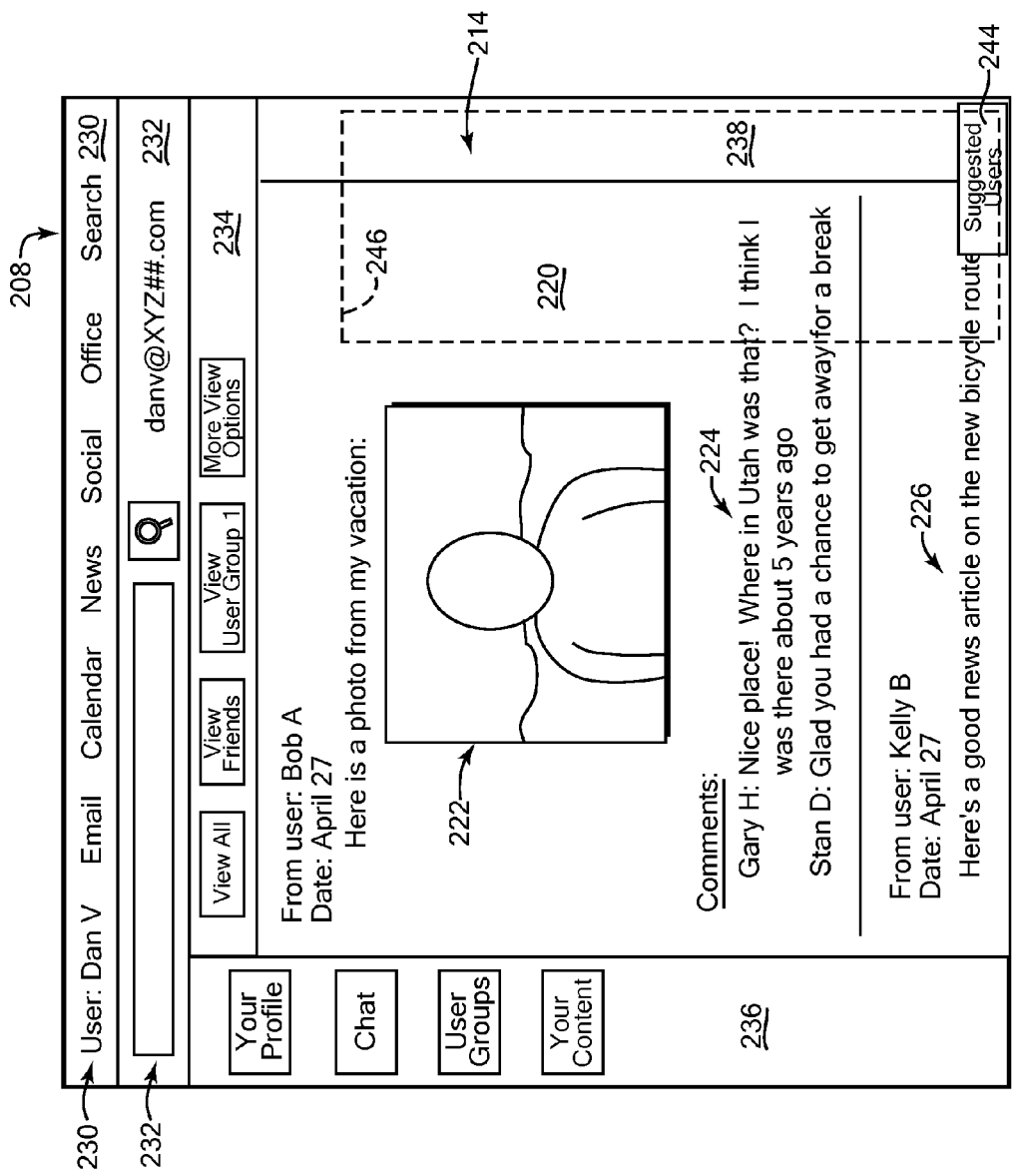
FIG. 4 is a diagrammatic illustration of the GUI in which the size of the view has been horizontally reduced.

FIG. 4 is a diagrammatic illustration of the graphical interface (GUI) 200 displaying the web page 214 in the view 208 (window 202 not shown), in which the size of the view 208 has been reduced horizontally. For example, the view 208 has been reduced in the horizontal dimension compared to the view 208 of FIG. 2, and has maintained the same vertical dimension. In some examples, the user may have dragged the right side border of the window 202 to the left to make the window 202 and view 208 smaller, or the interface 200 may have been re-displayed on a different display device having a smaller horizontal dimension.

In this example, the area of the vertical toolbar 238 displayed in the view 208 has been reduced by the moving of the right border of the view 208 toward the left. Since the text and icons of the toolbar 238 can no longer be displayed completely in the view 208, a feature allows a reduced display object or form 244 for an information area to be displayed. Such a reduced form can be displayed based one or more of various conditions in different implementations. For example, the reduced form can be displayed when any portion of the associated information area is outside the view 208 and not displayed in the view 208, when an information area has a threshold amount of its area outside the view 208, or when any portion of the items displayed by the information area are outside the view 208. In some implementations, the information in the toolbar 238 can be removed from the display if only a portion of that information is visible in the view. If the horizontal size of the view 208 is increased sufficiently to remove the associated conditions, the reduced form 244 can be removed from the view 208. In some implementations, the reduced form 244 can be in independent display mode so that it is displayed in view 208 regardless of the scrolled position of the data presentation in content area 220.

In some implementations, a user may select the reduced form 244, such as with a pointer or cursor controlled by an input device, by an associated contact on a touchscreen, etc., which causes a larger display form 246 to be displayed. The larger form 246 can display all of the original information and controls of the information area which the user may view and/or select. In some implementations, the larger form 246 can be similar to a window or panel that can be moved, closed, resized, or otherwise manipulated. This allows information areas that are not completely displayed in view 208 to provide their display functions when desired by the user, such as in a smaller window or smaller screen size.

Figure 5:
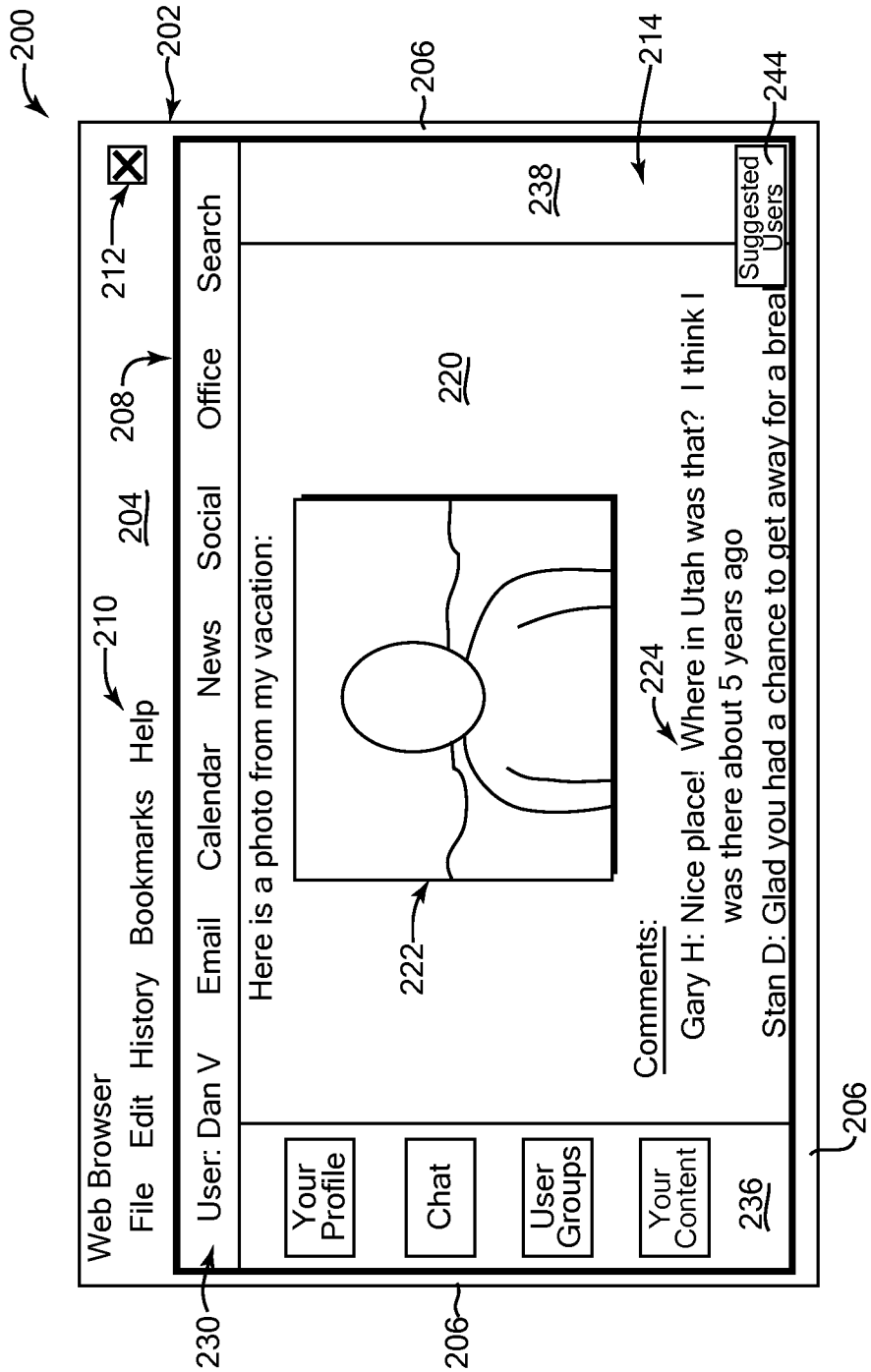
FIG. 5 is a diagrammatic illustration of the GUI displaying the data presentation scrolled and a view of further reduced size.

FIG. 5 is a diagrammatic illustration of the graphical interface (GUI) 200 displaying the data presentation in the view 208 (window 202 not shown), in an example in which the size of the view 208 has been reduced further relative to previous implementations and the data presentation has been scrolled. In this example, the vertical size of the window has been reduced compared to the view 208 in FIG. 2 and in FIG. 3 to a size below another predetermined threshold vertical size in addition to the threshold size used in FIG. 3. For example, the user may have dragged the bottom border of the window up to make the window 202 and view 208 smaller. Or, the interface 200 may have been re-displayed on a different display device having a smaller vertical display dimension. For example, if the view 208 in FIG. 2 is displayed on a larger screen monitor for a desktop computer, the view 208 in FIG. 5 might be displayed on a smaller or portable client device, such as a laptop device, tablet device, or cell phone device having a smaller screen.

The smaller size of view 208 in FIG. 5 causes the device to change one or more of the horizontal toolbars 230-234 of FIG. 2 from independent display mode to dependent display mode. In this example, both toolbars 232 and 234 have been changed to the dependent display mode. This causes the toolbars 232 and 234 to become associated with particular locations of the data presentation displayed in content area 220 and scrolled with the data. In one example, the vertical screen size has been reduced below a second threshold that is below the first vertical size threshold described above for FIG. 3. In this example, predetermined conditions require that two display areas in independent display mode be changed to dependent display mode if view size is below the second threshold. Furthermore, priority levels have been assigned to the toolbars, such that the toolbars 232 and 234 have lowest priority levels of the toolbars 230, 232, and 234. Therefore, due to the current vertical view size and their low priority levels, toolbars 232 and 234 are set to dependent display mode. This allows a larger view of the data presentation in the view 208 for a smaller view size than if these toolbars 232 and 234 were always displayed in independent display mode.

In other implementations, the toolbar 234 can be associated with the first threshold and the toolbar 232 can be associated with the second threshold. If the current screen size is below the first size threshold, toolbar 234 is set to dependent mode. If the current vertical screen size is also below a second threshold, then the toolbar 232 is set to dependent mode as well.

In this example, the toolbars 232 and 234 have been associated with a location in the data presentation at the top or beginning of the data. Since in FIG. 5 the data presentation in content area 220 has been scrolled upward, the beginning of the data presentation has been moved above the view 208 and is no longer displayed. Both toolbars 234 and 236 therefore have been scrolled out of the view 208 in FIG. 5. The user can cause the toolbars 234 and 236 to be displayed in view 208 by scrolling the data presentation to view the beginning of the data.

In addition, the horizontal view size of the view 208 in FIG. 5 has been reduced as compared to the horizontal view size shown in FIG. 2. The vertical toolbar 238 is now positioned at least partially outside the view 208. Thus, as in the implementation shown in FIG. 4, the information and controls in vertical toolbar 238 have been removed from the partially-displayed toolbar 238 and the reduced display form 244 is displayed. This allows the user to select the reduced form 244 to view the information in the vertical toolbar 238.

Figure 6:
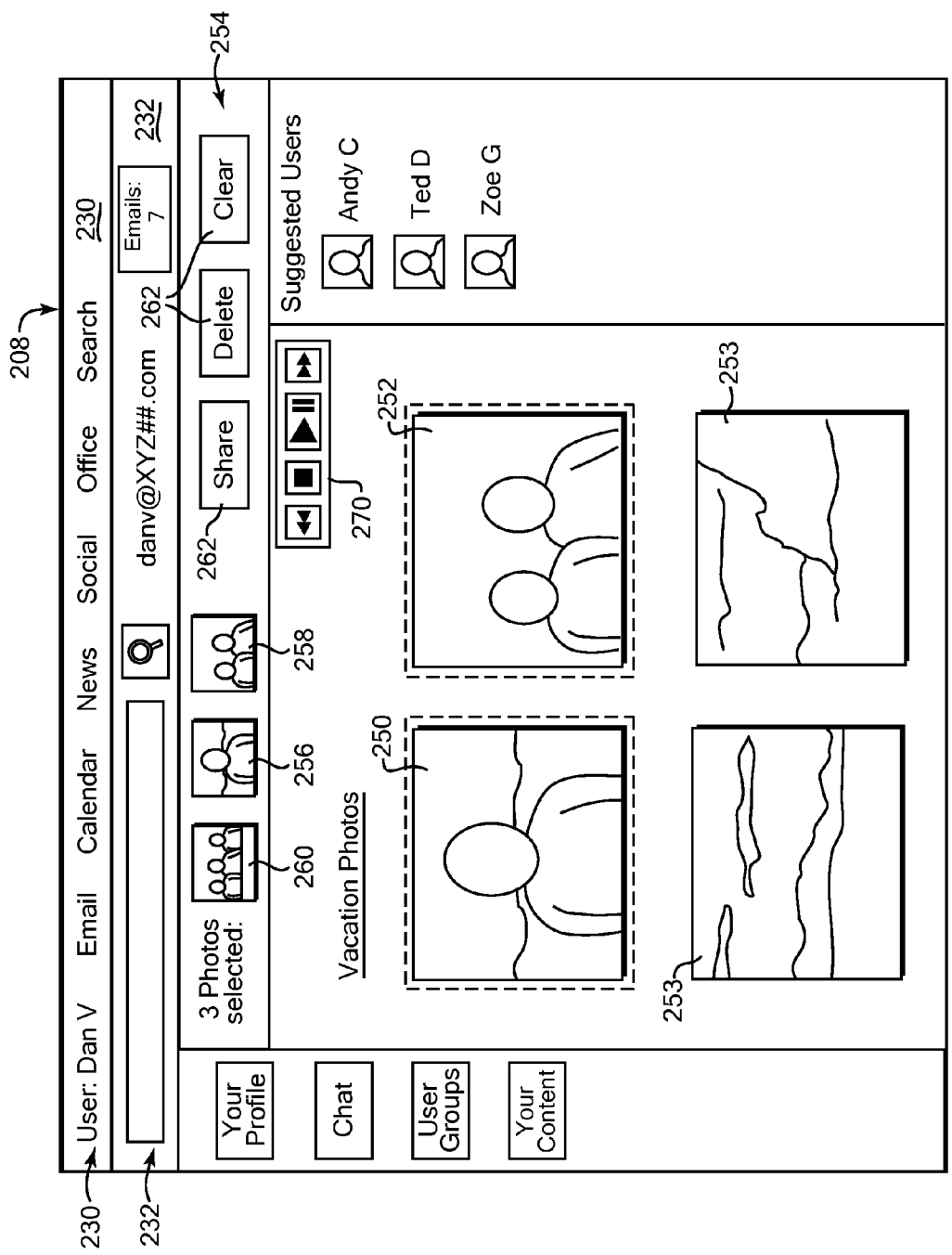
FIG. 6 is a diagrammatic illustration of the GUI displaying the data presentation and illustrating additional implementations of information areas.

FIG. 6 is a diagrammatic illustration of the graphical interface (GUI) 200 displaying the data presentation in the view 208 and illustrating additional implementations of information areas. In some implementations, the display mode of an information area can be based on a state of the device caused by user context in the interface or user input or action (such as selection) to access a particular function of the device or interface as presented by the interface. In the example of FIG. 6, the user has selected one or more content items within the data presentation and accessed a selection function. The user has selected the photos 250 and 252 in the example shown. A dashed line or other visual indication can indicate the selection of item, in contrast to unselected items such as photos 253 which are displayed without the visual indication.

In some implementations, in response to the selection of content items, a selection toolbar 254 can be displayed in the view 208. In some implementations, the selection toolbar can be displayed in place of a previous toolbar, such as toolbar 234 of FIG. 1. Selection toolbar 254 displays an image of each currently-selected item. For example, an image 256 of selected photo 250 can be displayed, as well as image 258 of selected photo 252. An image 260 is also displayed in this example for a selected photo in the data presentation that has been scrolled out of the view 208. Other controls 262 can also be displayed in the selection toolbar 254, such as buttons to cause particular functions to be performed when selected, including sharing, deleting, or clearing the selected items displayed in the selection toolbar 254.

In response to one or more items being selected, the selection toolbar 254 is set to independent display mode so that it is displayed in the view 208 regardless of which portion of the data presentation is currently being displayed in the view 208. The toolbar 254 can be maintained in independent display mode while at least one item is selected. This allows the selection toolbar to display the images of the selected items at all times to the user so that the user can readily see which items are currently selected. This is useful when the user needs to select multiple items from different portions of a data presentation and not all the items are visible at a time in the view 208. For example, the item associated with the image 260 in toolbar 254 is not displayed in the view 208 in FIG. 6 yet the user knows that the associated photo is currently selected. If the selected items are de-selected such that no items are currently selected, then the toolbar 254 can be changed to dependent display mode to allow it to be scrolled out of the view 208.

Other user selection, activation, or other accesses of interface functions (or other user input) can provide a state of the device to cause one or more information areas to be set to either the independent display mode or the dependent display mode. For example, the user may select a viewing mode of the interface for the data presentation to cause one or more of the toolbars to be set to dependent display mode, or select a search or find function to find one or more items in the data presentation and cause information items to be set to independent display mode.

In another example of display mode based on user function selection, media playback can be initiated by the user viewing the interface 200. For example, the user may select a music track or other audio selection (e.g., selected from a separate displayed track list, not shown) to be played to cause sound output from speakers at the user's client device. In some implementations, while the user has an audio playback function available, an information area 270 can be displayed to provide playback controls. The playback controls 270 can include multiple buttons, each button for performing a function related to audio playback. For example, buttons to cause a selected audio track to play, stop playing, pause playing, fast forward, rewind, go to next track, audio volume of output, etc. can be provided.

Playback controls 270 can be considered a single information area, or each button or control can be considered its own information area. The playback controls 270 are displayed in the view 208, such as in a corner of the view as shown. When the audio playback function is available but no track is currently being played, then the playback controls are displayed in dependent display mode such that they are associated with particular locations of the data presentation and scrolled with the data presentation. For example, the playback controls 270 can be associated with locations at the top and/or bottom of the data presentation. Some implementations can display the playback controls 270 in dependent display mode if audio playback functions become available to the user, such as at particular web sites, or if a particular function is enabled by the user. If the user selects a track to start playing, then the playback controls 270 are displayed in independent display mode. This allows the playback controls 270 to be displayed in the view 208 regardless of the portion of the data presentation being displayed, and allows the user to continuously have the option to stop, pause, or otherwise change audio playback.

In other implementations, other types of information areas can be similarly displayed and their display mode controlled by user selection of functions. For example, controls for the display or playback of images, video, or other media can be similarly implemented. Information areas that display status information of the device, media information (videos, images, text, etc.), or event information for incoming or external events (alarm ringing, calendar notification displayed, message from another user received or displayed, etc.) can have a display mode based on the particular states of the device related to these events or displays.

In some implementations, the displayed controls or information in an information area can be different depending on the current display mode. This can indicate different functions available in each mode. For example, if a track is currently playing and the playback controls 270 are in independent display mode, then "pause" and "stop" buttons can be displayed, while in dependent display mode a "play" button is displayed and the "stop" and "pause" buttons are not displayed. In some implementations, an indicator can be displayed in the information area to remind the user which display mode the information area is currently set.

Figure 7:
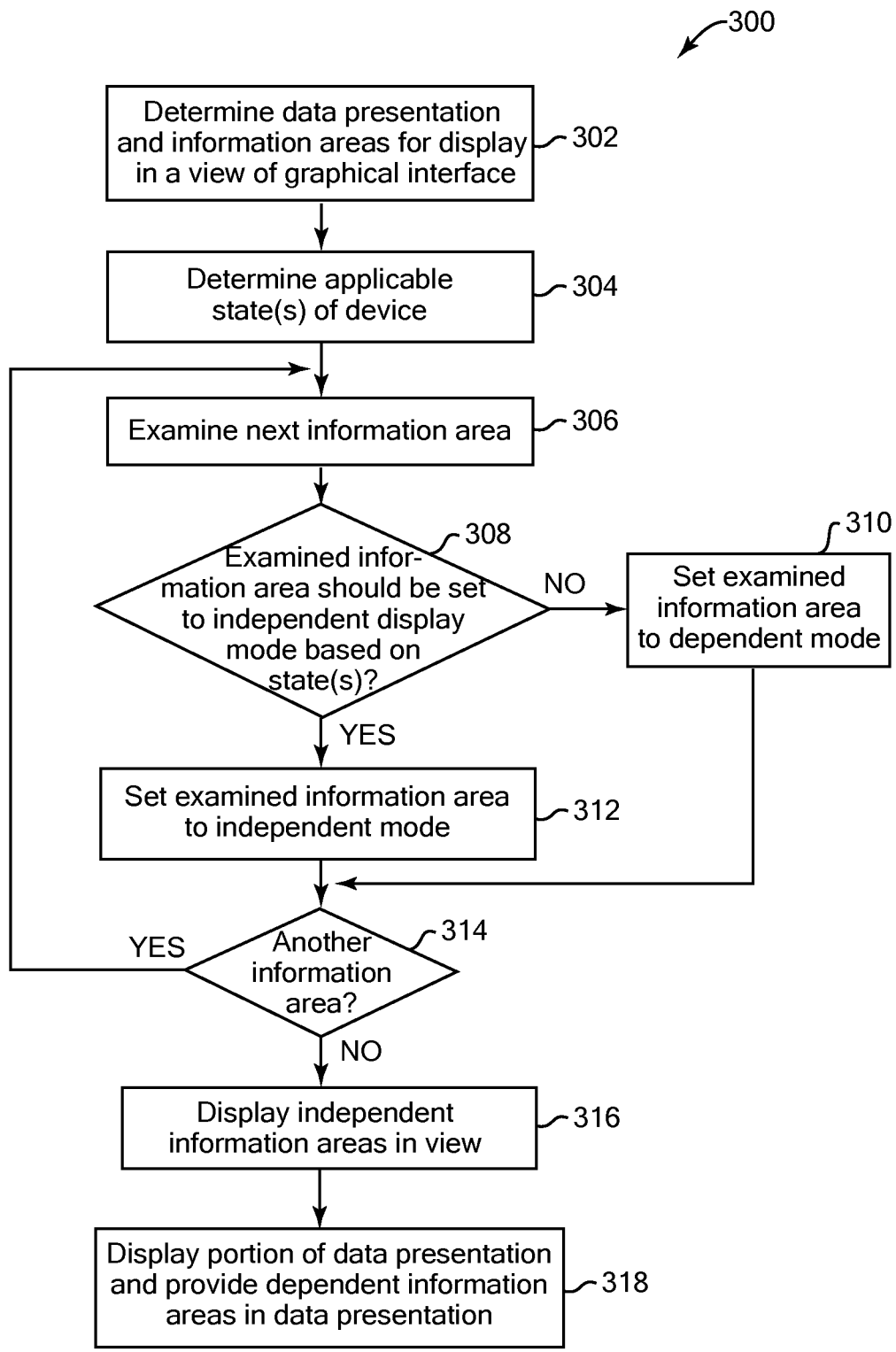
FIG. 7 is a flow diagram illustrating an example method of displaying information areas in a view of a graphical interface.

FIG. 7 is a flow diagram illustrating one example of a method 300 of displaying information areas in a view of a graphical interface. In some implementations, method 300 (and methods 350 and 400, below) can be implemented on a server system 102 as shown in FIG. 1. In some implementations, the method 300 is performed by a server device which sends the data for display to one or more client devices, such as server system 102 and client devices 120-126. In other implementations, the method can be performed by one or more client devices, or portions of the method performed by a server device and portions performed by a client device. Some implementations can take the form of a computer program product accessibly stored on a computer-readable medium providing program instructions or code for use by or implemented by a computer or any instruction execution system, such as one or more processors (e.g., microprocessors or other processing circuitry). The computer readable medium can be a magnetic, optical, electromagnetic, or semiconductor storage medium, including semiconductor or solid state memory, magnetic tape, removable computer diskette, random access memory (RAM), read-only memory (ROM), flash memory, rigid magnetic disk, optical disk, solid-state memory drive, etc. Alternatively, these methods can be implemented in hardware, for instance, logic gates, or in a combination of hardware and software. The method 300 can be a component of an application running on the client device, or a separate application or software running in conjunction with other applications and operating system.

In block 302, the device determines a portion of a data presentation and information areas for display in a determined view of a displayed graphical interface. The graphical interface can be displayed on a display device of a client device of a user, or alternatively on a server device. The view in the interface is an area for displaying a data presentation in the graphical interface, such as the viewport of a window. As described in examples mentioned above, the data presentation can be a document, web page, set of images, or other data. The device retrieves or otherwise obtains the data for the data presentation, the information areas, and any other required features (such as view size) for eventual display.

In block 304, applicable state(s) of the device are determined, where the applicable states are states which affect the display mode of information items described herein. In various implementations, an applicable state of the device can be a size of a view in the displayed graphical interface, the selection of a function by the user viewing the graphical interface, and/or an event occurring internally in the device or externally to the device, such as a notification based on a calendar or alarm, an incoming message from an external source, etc. Each information area displayed in the view of the graphical interface can be associated with one or more states of the device which, when occurring, set or change the display mode of the information area as described below.

In block 306, the device examines the next information area for which to set a display mode. When performing block 306 for the first time, the device examines an initial information area. In block 308, the device checks whether the examined information area should be set to independent display mode or to dependent display mode, based on the state(s) of the device determined in block 304. If the information area should be set to dependent display mode, then the process continues to block 310 to set the information area to dependent mode, and the process continues to block 314, described below. If in block 308 the area should be set to independent display mode based on the device's state(s), then the process continues to block 312 to set the information area to independent mode, and continues to block 314.

In block 314, the device checks if there is another information area to examine for setting its display mode. If so, the process returns to block 306 to examine the next information area. If there are no more information areas to set for display mode, then the process continues to block 316 in which the independent information areas are displayed in the view of the interface. These information areas are displayed independently of the data presentation displayed in the view, and, for example, can be displayed in the view regardless of which portion of the data presentation is being displayed in the view (and can be moved within the view, e.g., by a user or program). In block 318, the device displays the appropriate portion of the data presentation appearing in the view. In addition, dependent mode information areas are associated with one or more particular locations in the data presentation, as part of the data. For example, the dependent mode information areas may be associated with locations at the top of the data presentation, or at different predetermined locations in the data presentation. If a location of the dependent mode information area is currently in a displayed portion, then the associated dependent mode information area is also displayed. If that location is moved out of the view when the data presentation is scrolled or otherwise moved, then the dependent mode information area is also moved out of the view and no longer displayed.

Figure 8:
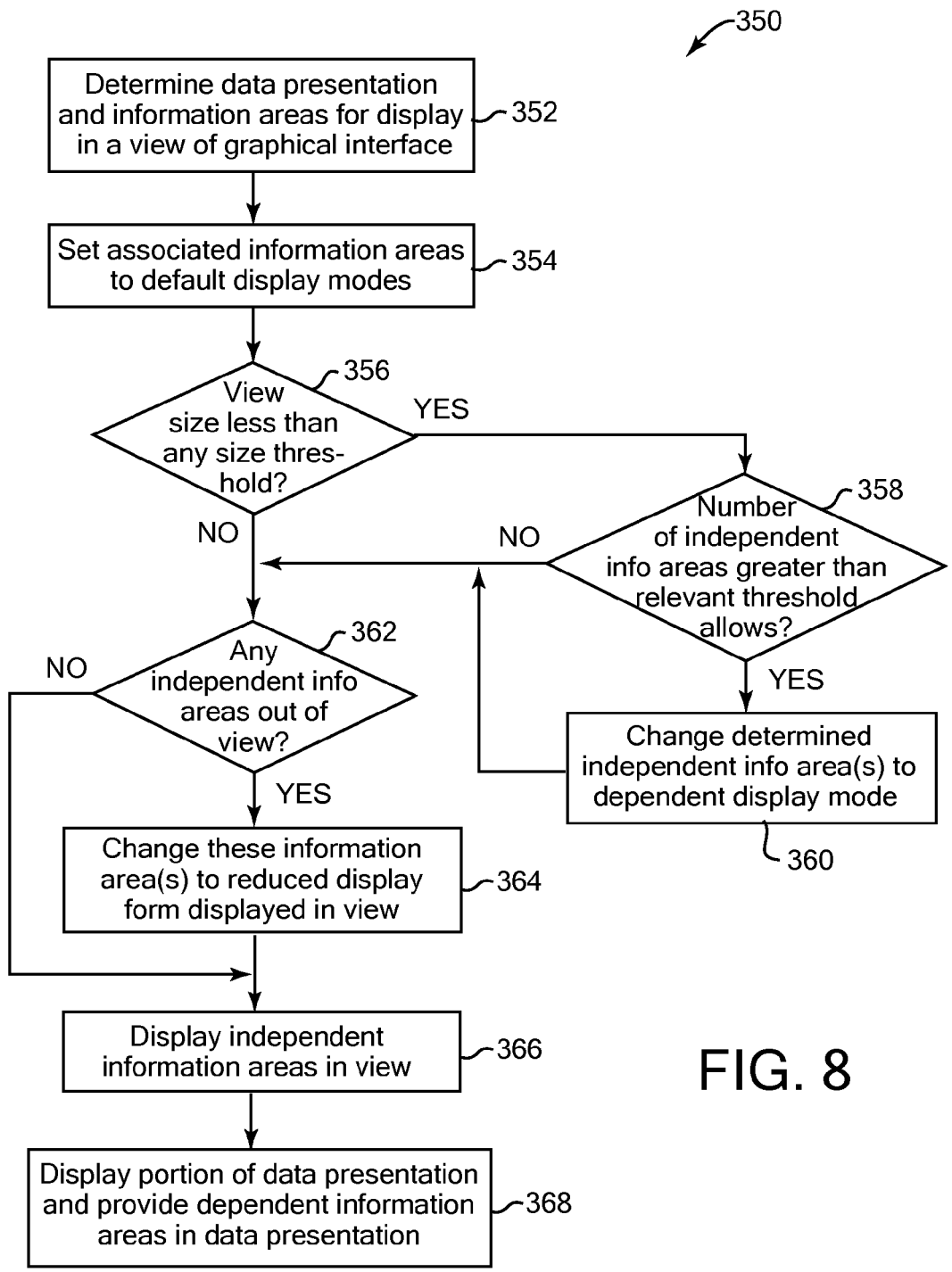
FIG. 8 is a flow diagram illustrating an example method of displaying information areas based on size of the view.

FIG. 8 is a flow diagram illustrating one example of a method 350 of displaying information areas in a view of a graphical interface based on size of the view. Method 350 can be implemented on software and/or hardware systems similarly as described for method 300 of FIG. 7.

In block 352, the device determines a portion of a data presentation and information areas for display in a determined view of a displayed graphical interface. As described above, the view in the interface is a display area for displaying a data presentation in the graphical interface. The device obtains the data for the data presentation, the information areas, and any other required features (such as view size) for eventual display. In block 354, each information area provided in the view can be initially set to a default display mode. Each information area can be associated with a default display mode which assumes particular default or desired conditions, such as a predetermined standard view size or maximum view size. For example, each horizontal toolbar 230, 232, and 234 shown in FIG. 2 can be initially set to independent display mode.

In block 356, the device determines the current size of the view and checks whether the view size is less than any of one or more predetermined size thresholds intended for display mode selection. For example, in some implementations, one view size threshold may be used, which can govern the display mode of one or more associated information areas displayable in the view. In other implementations, multiple view size thresholds can be designated, where each size threshold can pertain to a different associated set of information areas. Some implementations can designate single-dimension thresholds, such as a vertical threshold or a horizontal size threshold, where some of the multiple thresholds are for the vertical dimension of the view and other thresholds are for the horizontal dimension. In some implementations, one or more of the size thresholds can be designated or adjusted by the user viewing the graphical interface, as settings or preferences.

If the view size is currently less than any of the predetermined size thresholds in block 356, then the process continues to block 358 in which the device checks whether the number of independent mode information areas is greater than the number of such areas that the relevant threshold allows. In some implementations, each size threshold can be associated with a maximum number of information areas that can be displayed in independent display mode in the view dimension governed by that threshold. In one example, the relevant threshold for a given view size can be the closest threshold greater than that given view size. This use of a maximum number of information areas in independent display mode prevents too many information areas from being displayed in smaller vertical view sizes, which would cover up too large a portion of the data presentation in the view. FIG. 5 illustrates an example of a smaller view size. Thus, the viewable area of the data presentation is increased for smaller views while allowing more information areas to be displayed in independent mode for larger views that can support such displays.

In one non-limiting example, if the view size is below the vertical size threshold, then a maximum of two horizontal toolbars can be displayed in independent mode. In another example with multiple thresholds, the first vertical size threshold can allow a maximum of two horizontal toolbars in independent mode if the view size is under the first threshold, and no maximum above that threshold. A second vertical size threshold can allow a maximum of one horizontal toolbar in independent mode if the vertical view size is under the second threshold. In a more specific non-limiting example, the first vertical size threshold can be 800 pixels and the second vertical size threshold can be 528 pixels. Thus, if the current view size is greater than 800 pixels vertically, there can be any number of toolbars displayed in independent display mode. If the view size is less than 800 pixels but greater than 528 pixels vertically, then the first threshold is the relevant threshold and there can be a maximum of two horizontal toolbars in independent display mode. If the view size is less than 528 pixels vertically, then the second threshold is the relevant threshold and there can be a maximum of one horizontal toolbar in independent display mode.

As checked in block 358, if the number of independent mode information areas is not greater than allowed by the thresholds, then the default display modes are correct for the information areas and the process continues to block 362. Otherwise, the process continues to block 360, in which the device changes any appropriate information areas from independent display mode to dependent display mode. The appropriate information areas are areas currently in independent display mode that have been determined to be changed based on particular criteria. The criteria governing which particular information areas are changed to dependent display mode can vary depending on the implementation. In some implementations, each information area can be assigned an associated priority level, such that an information area having a lower priority level has less priority in being assigned or maintaining the independent display mode than an information area having a higher priority level. The device can examine the pertinent information areas and change or set the needed number of information areas associated with the lowest priority levels to dependent display mode. The process then continues to block 362, described below. In some implementations, one or more of the information areas can be associated with a high enough priority level that they are never set to or changed to dependent display mode and will always be displayed in independent display mode when displayed. Some implementations can allow the device or process to determine the priority level of current information areas based on predetermined criteria, such as current size of the information area (e.g., larger areas having less priority since they will free up more view area for data), position of the area within the view, or other characteristic(s).

In one example referring to FIG. 2, the horizontal toolbars 230, 232, and 234 can each be assigned a different priority level. For example, the toolbar 230 can be assigned a higher priority level than the toolbar 232, and the toolbar 232 can be assigned a higher priority level than the toolbar 234. If the view vertical size is above the first vertical size threshold described above, then all three toolbars are displayed in independent mode, allowing the user to reference the controls and information in all the toolbars at all times that the view is displayed. If the view vertical size is less the first threshold and above the second threshold as described above, then a maximum of two horizontal toolbars can be displayed in independent mode. Since the toolbar 234 has the lowest priority of these three toolbars, it is changed to dependent display mode and therefore can be scrolled out of the view when the data presentation is scrolled sufficiently. In addition, the toolbar 234 may be immediately removed from display if its location in the data presentation is not currently in the view. Similarly, if the vertical view size is less the second threshold as described above, then a maximum of one horizontal toolbar can be displayed in independent mode, and both the toolbars 232 and 234 are changed to dependent display mode in block 360. In some implementations, similar determinations can be made for horizontal view size thresholds and vertically-arranged information areas such as vertical toolbars 236 and 238 of FIG. 2.

If the view size is not less than any size threshold in block 356, then the default display modes are correct for the information areas and none of the default display modes need to be changed, and the process continues to block 362.

In some alternate implementations for the features of blocks 356, 358 and 360, one or more of the information areas (or each information area) can each be associated with a screen size threshold to govern the display mode of those information areas. For example, each information area can be examined in turn and set to the appropriate display mode based on the current view size as compared to the associated relevant threshold for that information area. For example, the toolbar 234 of FIG. 2 can be associated with the first threshold described above, such that the toolbar 234 is set to independent display mode if the view size is over the first threshold, and is set to dependent display mode if the view size is under the first threshold. The toolbar 232 can be similarly associated with the second threshold, and so on.

In block 362, the device checks whether any of the independent information areas are partially or completely positioned out of the current view of the interface. For example, this can occur for vertically-arranged information areas such as vertical toolbar 238 if the view is set or changed to have less horizontal size. For example, in FIG. 4, the view has been reduced in size by moving the right side of the view towards the left side, which causes the information in toolbar 238 to be positioned at least partially outside the view. If this is not the case, then the process continues to block 366, described below. Otherwise, in block 364, the device sets or changes the hidden information areas to a reduced display form that is displayed in the view. For example, as shown in FIG. 4, a reduced control object or form 244 can be displayed, which when selected can cause a larger area to be displayed in the view which presents the information and/or controls the out-of-view information area. In some implementations, the reduced display form can be moved, removed from the view, or otherwise manipulated by the user. The process then continues to block 366. Blocks 362 and 364 can also be performed in any implementations described herein, such as the implementation of FIG. 7.

In block 366, the device displays the independent information areas in the view. In block 368, the device displays the appropriate portion of the data presentation appearing in the view, and provides the dependent mode information areas in the data presentation as part of the data. Providing the dependent mode areas includes associating these information areas with predetermined locations of the data presentation and displaying any dependent mode information areas associated with locations currently positioned in the view.

Figure 9:
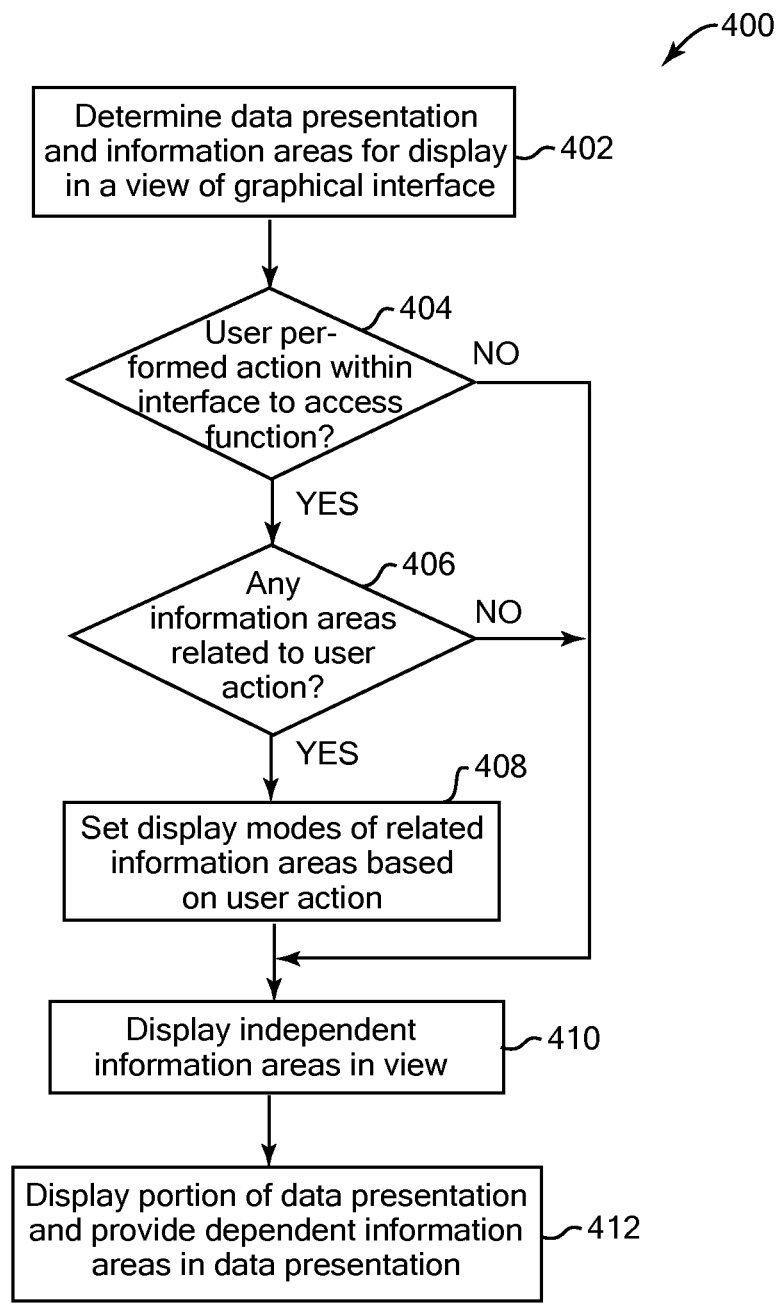
FIG. 9 is a flow diagram illustrating an example method of displaying information areas based on user interaction with the device or graphical interface.

FIG. 9 is a flow diagram illustrating an example of a method 400 of displaying information areas in a view of a graphical interface based on user input such as user interaction with the device or graphical interface. Method 400 can be implemented on software and/or hardware systems similarly as described for method 300 of FIG. 7.

In block 402, the device determines a portion of a data presentation and information areas for display in a determined view of a displayed graphical interface. As described above, the device obtains the data for the data presentation, the information areas, and any other required features for eventual display. In block 404, the device checks whether the user has performed any action within the graphical user interface to access a function presented by the graphical interface. For example, the user action can be selecting one or more items in the data presentation, selecting playback of a media file, selecting a word processing, spreadsheet, web browser, or other function.

If no such user action has been performed, the process continues to block 410, described below. If such a user action has been performed, then in block 406 the device checks whether any information areas for display in the view are related to the user action. In this context, a related information area is one that presents information or one or more controls related to the function accessed by the user, and/or has a display mode that is affected by the accessed function. For example, in the example of FIG. 6, the selection toolbar 254 is related to the user action of selecting a photo item in the data presentation, where the toolbar 254 displays an image of the selected item. The toolbar 254 also has a display mode that can be affected by user selection of items. In another example of FIG. 6, the playback control information area 270 is related to the user action of playing an audio track, since the display mode of the playback control 270 is based on whether a track is being played.

If there are no information areas related to the user action, then the process continues to block 410, described below. If one or more information areas are related, then in block 408 the device sets the display modes of the related information areas based on the user action. For example, the selection toolbar 254 is set to an independent display mode if the user action was to select an initial item in the data presentation. If the user action is to deselect the last item displayed in the selection toolbar, then the toolbar 254 is set to a dependent display mode. If the user action selects or deselects an item and one or more items remain selected, then the display mode of the toolbar 254 is maintained in independent display mode. Other information areas may have a display mode similarly dependent on other types of batch actions besides selection. In the example of playback controls 270, if the user action is to play the audio track by selecting a play or unpause button, then the display mode of the controls is set to independent mode. If the user action is to stop playback, then dependent display mode is set.

In block 410, the independent information areas are displayed in the view. In block 412 the device displays the appropriate portion of the data presentation appearing in the view, and provides the dependent mode information areas in the data presentation as part of the data. Providing the dependent mode areas includes associating these information areas with predetermined locations of the data presentation and displaying any dependent mode information areas associated with locations currently positioned in the view.

In some implementations, the process can return to block 404 periodically to continually re-check for user actions and display mode settings or changes for related information areas.

It should be noted that the blocks described in the methods of FIG. 7-9 can be performed in a different order than shown and/or simultaneously (partially or completely) with other blocks of that method or other described methods, where appropriate. In some implementations, blocks can occur multiple times, in a different order, and/or at different times in the methods.

Figure 10:
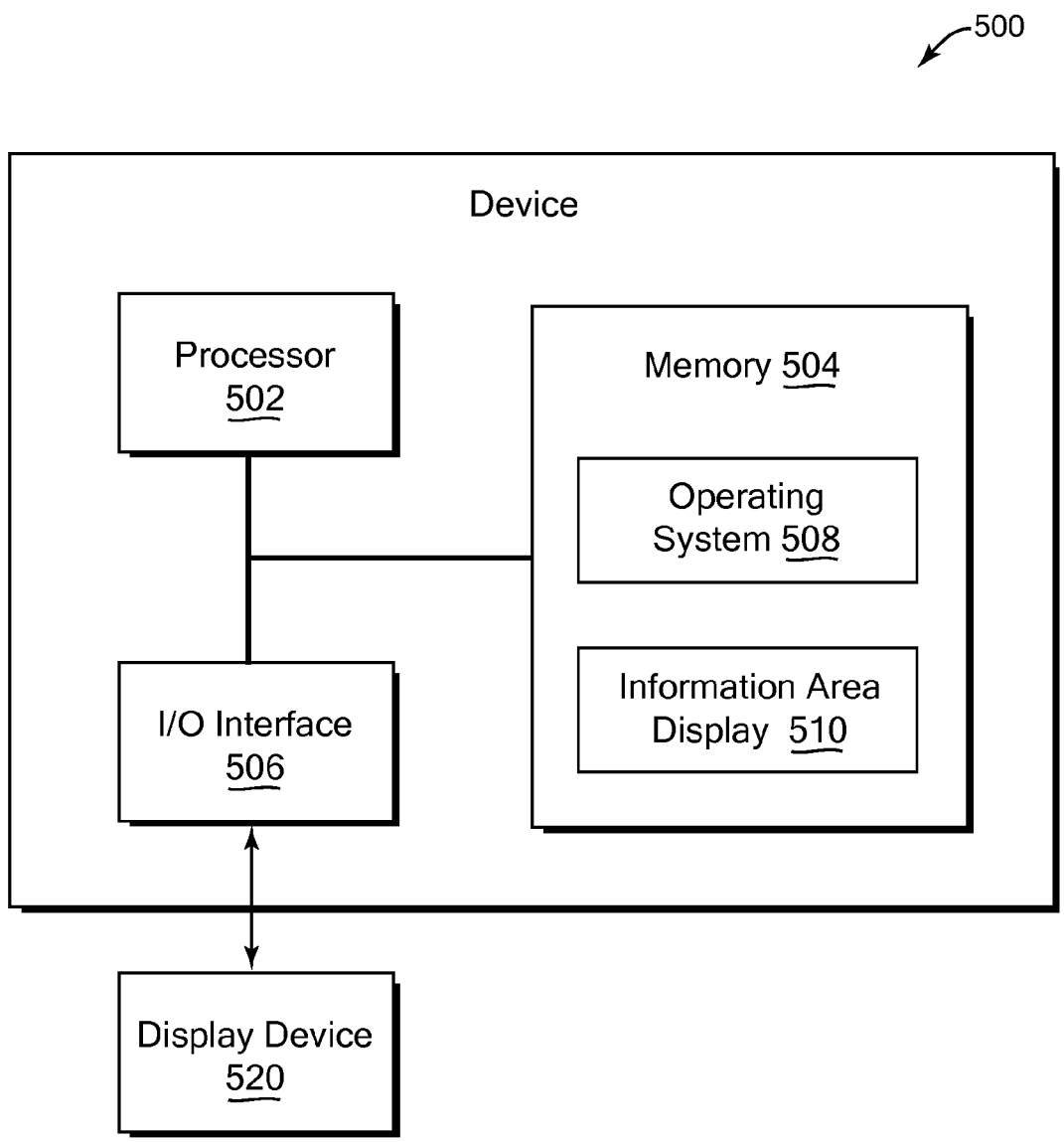
FIG. 10 is a block diagram of an example device which may be used for one or more implementations described herein.

FIG. 10 is a block diagram of an example device 500, which may be used to implement some implementations described herein. For example, device 500 may be used to implement any of the client devices 120-126 of FIG. 1, and perform appropriate method implementations described herein or parts thereof. Alternatively, device 500 can be a server device 104 for performing methods described herein or parts thereof. Device 500 can be any suitable computer system, server, or other electronic or hardware device. For example, the device 500 can be a mainframe computer, desktop computer, workstation, portable computer, or electronic device (portable device, cell phone, smart phone, tablet computer, television (e.g., television with one or more processors embedded therein and/or coupled thereto), television set top box, personal digital assistant (PDA), media player, game device, etc.). In some implementations, device 500 includes a processor 502, a memory 504, and input/output (I/O) interface 506.

Processor 502 can be one or more processors or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separately from processor 502 and/or integrated therewith. Memory 504 can store software operating on the server device 500 by the processor 502, including an operating system 508 and software for display of information areas 510. In some implementations, the software 510 can include instructions that enable processor 502 to perform functions described herein, e.g., some or all of the methods of FIG. 7-9. Any of software in memory 504 can alternatively be stored on any other suitable storage location or computer-readable medium. In addition, memory 504 (and/or other connected storage device(s)) can store data for data presentations, information areas, graphical interfaces, and other data used in the features described herein. Memory 504 and any other type of storage (magnetic disk, optical disk, magnetic tape, or other tangible media) can be considered "storage devices."

I/O interface 506 can provide functions to enable interfacing the server device 500 with other systems and devices. For example, network communication devices, storage devices such as memory and/or database 106, and input/output devices can communicate via interface 506. In some implementations, the I/O interface can connect to interface devices such as input devices (keyboard, pointing device, touchscreen, microphone, camera, scanner, etc.) and output devices (display device, speaker devices, printer, motor, etc.). A display device 520, for example, can be used to display the graphical interfaces described herein, where such display device 520 can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the form fields.

For ease of illustration, FIG. 10 shows one block for each of processor 502, memory 504, I/O interface 506, and software blocks 508 and 510. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. While a client device or server system is described as performing blocks or steps as described in some implementations herein, any suitable component or combination of components of a device or similar system, or any suitable processor or processors associated with such a system, may perform the blocks described.

Although the description has been described with respect to particular implementations, these particular implementations and implementations are merely illustrative, and not restrictive. Concepts illustrated in the examples may be applied to other examples and implementations.

Features described herein under a single heading do not need to be included in a single implementation together. Furthermore, features described herein under different headings can be used together with implementations described under other headings.

Note that the functional blocks, methods, devices, and systems described in the present disclosure may be integrated or divided into different combinations of systems, devices, and functional blocks as would be known to those skilled in the art. Any suitable programming language and programming techniques may be used to implement the routines of particular implementations. Different techniques may be employed such as procedural or object-oriented programming. The routines may be executed on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:
1. A method comprising:
    causing a display by a device of a portion of a data presentation within a view in a graphical interface, the graphical interface displayed on a display of a display device, wherein the data presentation is scrollable relative to the view allowing the display of different portions of the data presentation in the view, wherein the displayed portion of the data presentation is displayed in a single viewport within the view;
    determining at least one current state of the device, including determining a size of the view; and causing a display of one or more information areas within the view;

wherein causing the display of one or more information areas includes determining a display mode from a plurality of available display modes for each of the information areas based on the at least one current state, wherein the available display modes include an independent display mode and a dependent display mode, wherein the independent display mode causes an information area to be displayed fixed in position within the view regardless of scrolling of the data presentation with respect to the view and regardless of which of the portions of the data presentation is being displayed in the view, and the dependent display mode causes the information area to be associated with a location in the data presentation, causes the information area to be displayed within the view in response to the associated location being provided in the displayed portion of the data presentation, causes the information to be scrolled with the portion of the data presentation in response to the associated location being scrolled within the view, and causes the information area to be removed from the display in response to the associated location being scrolled out of the view, wherein the determined display modes for the one or more information areas are based on the determined size of the view; and changing the display mode of at least one of the one or more information areas from the independent display mode to the dependent display mode in response to a change in the size of the view that causes the size to be under a predetermined threshold size.

2. The method of claim 1 wherein only one of the display modes is active at a time for at least one of the information areas, and wherein one of the associated locations for the one or more information areas in the dependent display mode is at a beginning of the data presentation, such that the one or more information areas in the dependent display mode are displayed in the view in response to the data presentation being scrolled to display the portion of the data presentation that includes the beginning of the data presentation.

3. The method of claim 1 wherein at least one of the information areas is a toolbar displaying at least one of:
at least one control selectable by the user for accessing one or more functions of the graphical interface or the device; and
status information for the graphical interface or for the device.

4. The method of claim 1 wherein determining at least one current state of the device further includes determining that a user has accessed a function presented by the graphical interface, wherein the independent display mode is selected for the one or more information areas in response to determining that the user has accessed the function and determining that the size of the view is greater than or equal to the predetermined threshold size, and wherein the dependent mode is selected for the one or more information areas in response to at least one of:
determining that the user has not accessed the function, and
determining that the size of the view is less than the predetermined threshold size.

5. The method of claim 4 wherein the determining that the user has accessed the function includes receiving a selection by the user of one or more items within the data presentation, wherein at least one information area of the one or more information areas displays an image for each of the associated selected items, each image corresponding to and visually identifying its associated item.

6. The method of claim 4 wherein determining that the user has accessed the function includes receiving an input from the user causing the device to output media data, wherein one of the information areas displays one or more controls for outputting the media data,
wherein determining that the user has not accessed the function includes receiving an input from the user causing the device to cease output of the media data, and
wherein at least one of the one or more controls displayed in the information area is different during the independent display mode than during the dependent display mode.

7. The method of claim 1 wherein the one or more information areas are multiple information areas, and wherein each of the information areas has a different associated priority level, such that an information area having a lower priority level has less priority in being assigned the independent display mode than an information area having a higher priority.

8. The method of claim 7 wherein determining the size of the view includes determining that the size of the view is being reduced,
wherein changing the display mode of at least one of the one or more information areas includes changing the display mode only of the information area having the lowest priority.

9. The method of claim 1 wherein the independent display mode is determined for a particular information area, and further comprising:
displaying the particular information area to one side of the data presentation if the view is above a threshold dimension; and
displaying a smaller-sized reduced form of the particular information area over the data presentation if the view is under a threshold dimension.

10. The method of claim 1, wherein
at least one of the information areas is a toolbar displaying at least one of:
at least one control selectable by the user for accessing one or more functions of the graphical interface or the device, and
status information for the graphical interface or for the device.

11. A system comprising:
a storage device; and
at least one processor accessing the storage device and operative to perform operations comprising:
causing a display by a device of a portion of a data presentation within a view in a graphical interface, the graphical interface displayed on a display of a display device, wherein the data presentation is scrollable relative to the view allowing the display of different portions of the data presentation in the view, wherein the displayed portion of the data presentation is displayed in a single viewport within the view;
determining at least one current state of the device, including determining a size of the view;
causing a display of one or more information areas within the view,
wherein causing the display of one or more information areas includes determining a display mode from a plurality of available display modes for each of the information areas based on the at least one current state, wherein the available display modes include an independent display mode and a dependent display mode, wherein the independent display mode causes an information area to be displayed fixed in position within the view regardless of scrolling of the data presentation with respect to the view and regardless of which of the portions of the data presentation is being displayed in the view, and the dependent display mode causes the information area to be associated with a location in the data presentation, causes the information area to be displayed within the view in response to the associated location being provided in the displayed portion of the data presentation, causes the information area to be scrolled with the portion of the data presentation in response to the associated location being scrolled within the view, and causes the information area to be removed from the display in response to the associated location being scrolled out of the view, wherein the determined display modes for the one or more information areas are based on the determined size of the view; and changing the display mode of at least one of the one or more information areas from the independent display mode to the dependent display mode in response to a change in the size of the view that causes the size to be under a predetermined threshold size.

12. The system of claim 11 wherein at least one of the information areas is a toolbar displaying at least one of:
- at least one control selectable by the user for accessing one or more functions of the graphical interface or the device; and
- status information for the graphical interface or for the device.

13. The system of claim 11 wherein the one or more information areas are multiple information areas, and wherein each of the information areas has a different associated priority level, such that an information area having a lower priority level has less priority in being assigned the independent display mode than an information area having a higher priority.

14. The system of claim 11 wherein the independent display mode is determined for a particular information area, and further comprising operations of:
- displaying the particular information area to one side of the data presentation if the view is above a threshold dimension; and
- displaying a smaller-sized reduced form of the particular information area over the data presentation if the view is under a threshold dimension.

15. The method of claim 1 wherein in response to an information area of the one or more information areas being in the dependent display mode, the information area is displayed as if it has been made part of the data presentation.

* * * * *